United States Patent [19]

Stadelmann et al.

[11] Patent Number: 4,675,760
[45] Date of Patent: Jun. 23, 1987

[54] INFORMATION SIGNAL RECORDING AND/OR PLAYBACK SYSTEM AND METHOD USING A PRERECORDED REFERENCE TRACK

[75] Inventors: George A. Stadelmann, Groveland; John P. Watney, Los Altos, both of Calif.

[73] Assignee: Ampex Corporation, Redwood City, Calif.

[21] Appl. No.: 838,741

[22] Filed: Mar. 11, 1986

[51] Int. Cl.$^4$ ............................................. G11B 5/56
[52] U.S. Cl. ...................................................... 360/77
[58] Field of Search ............................................ 360/77

[56] References Cited

U.S. PATENT DOCUMENTS

| | | | |
|---|---|---|---|
| 3,362,021 | 1/1968 | Ma et al. | 360/77 |
| 3,474,432 | 10/1969 | Sevilla | 360/77 |
| 3,526,726 | 9/1970 | Corbett et al. | 179/100.2 |
| 3,845,500 | 10/1974 | Hart | 360/77 |
| 4,014,040 | 3/1977 | Kornhaas | 360/77 |
| 4,176,381 | 11/1979 | De Niet et al. | 360/77 |
| 4,229,773 | 10/1980 | Sakamoto | 360/77 |
| 4,347,534 | 8/1982 | Kimura | 360/77 |
| 4,392,163 | 7/1983 | Rijckaert et al. | 360/76 |
| 4,418,366 | 11/1983 | Moriya | 360/75 |

FOREIGN PATENT DOCUMENTS 1260706  1/1972  United Kingdom .

Primary Examiner—George G. Stellar
Attorney, Agent, or Firm—Elizabeth E. Strnad; Joel D. Talcott

[57] ABSTRACT

A reference track is recorded in a longitudinal direction on a recording medium. During recording of an information signal along parallel tracks on the medium a deviation of the reference track in a transverse direction from its nominal position with respect to the medium transport is detected by one or more sensor heads mounted in a fixed relationship with respect to the medium transport. A positionably mounted data head is moved in transverse direction in accordance with the sense and magnitude of the detected deviation, thereby maintaining the data head in a known geometric relationship with the reference track during the recording process. During playback the same reference track may be utilized to follow the thusly recorded parallel tracks.

24 Claims, 8 Drawing Figures

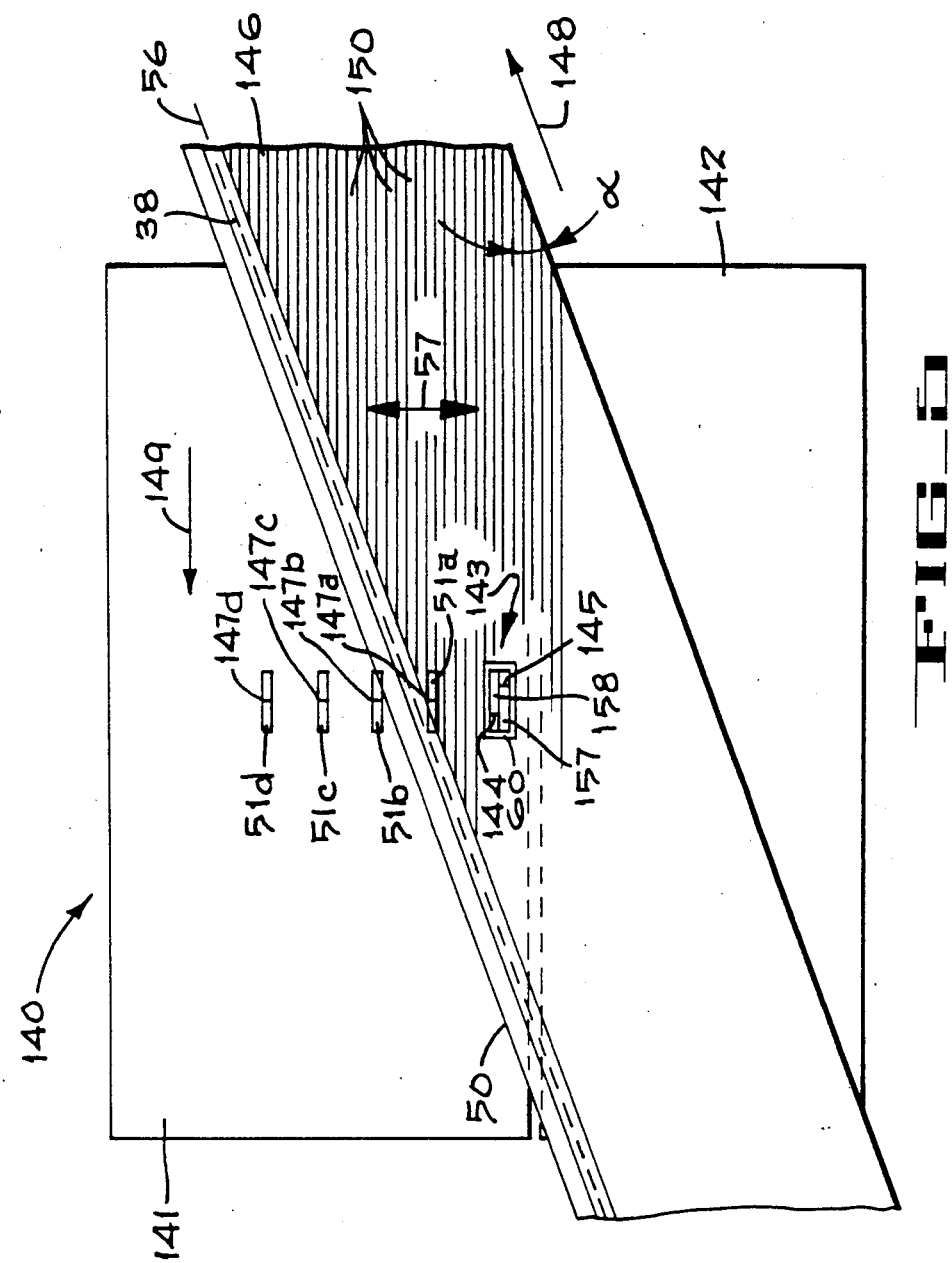

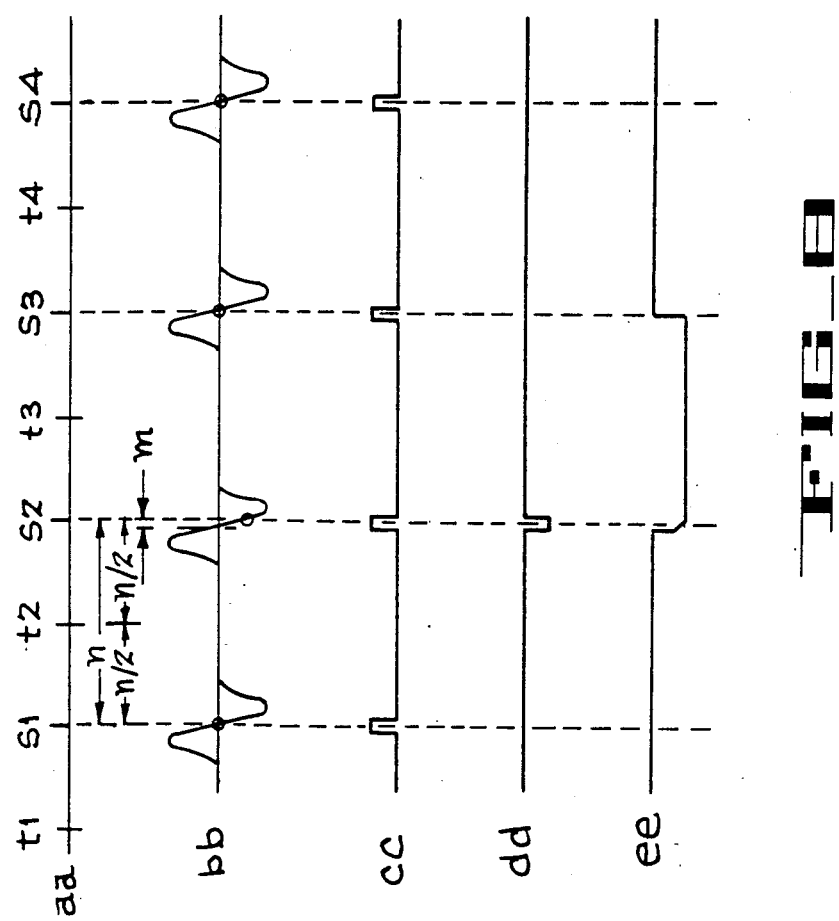
FIG_8
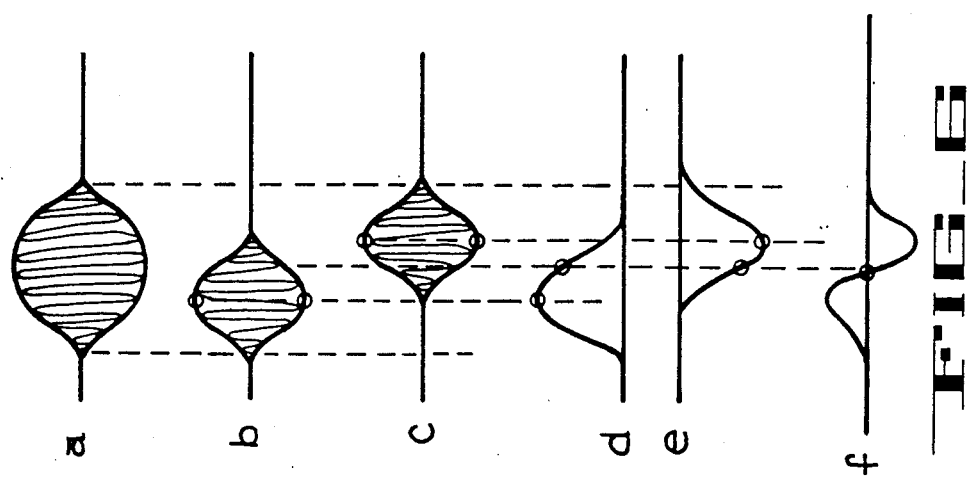
FIG_6

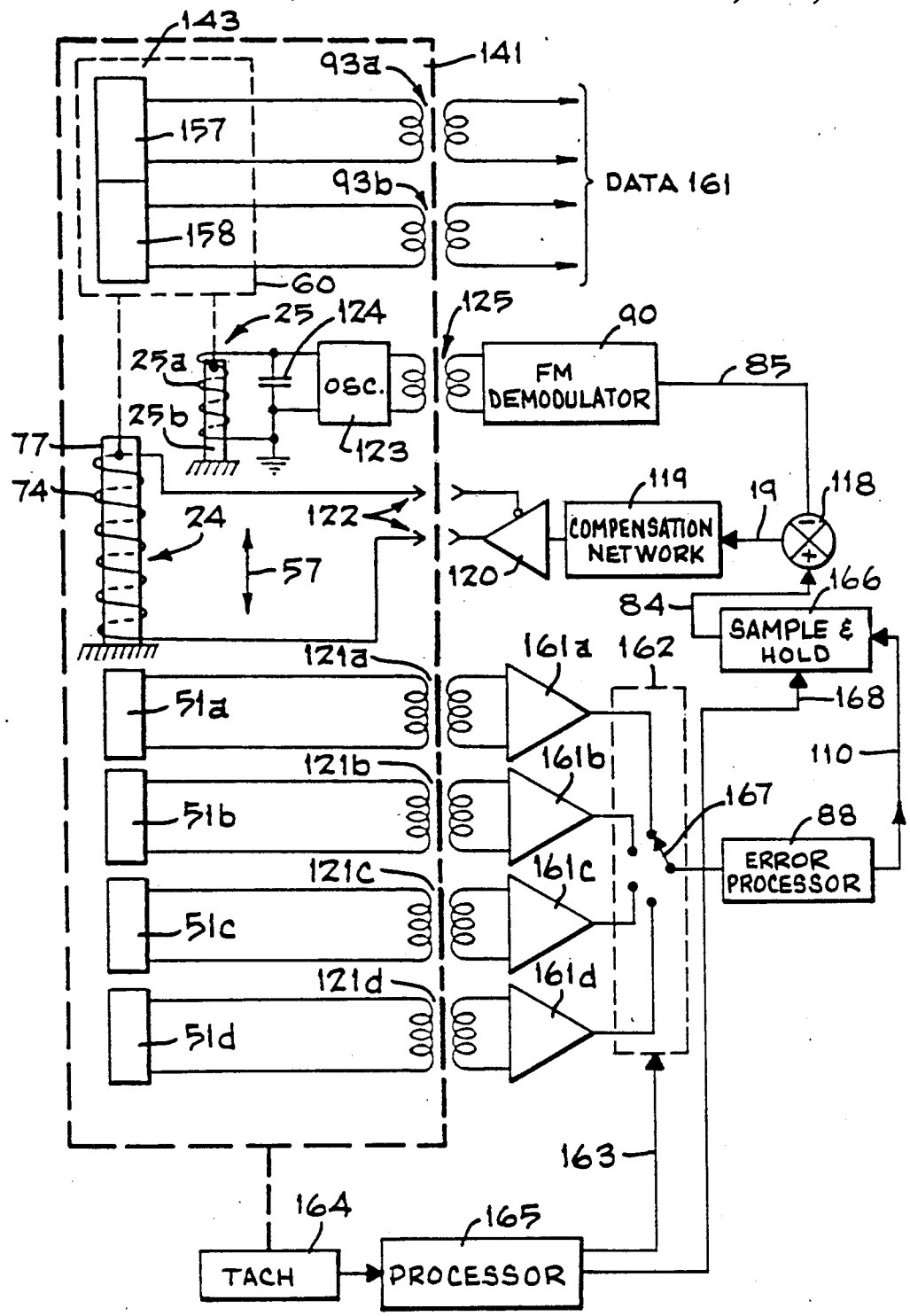
FIG_7

INFORMATION SIGNAL RECORDING AND/OR PLAYBACK SYSTEM AND METHOD USING A PRERECORDED REFERENCE TRACK

The invention described herein was made in the course of Contract No MDA-904-83-C-0470 awarded by the United States government.

BACKGROUND OF THE INVENTION

The present invention relates to a system and method for recording and/or reproducing signals with respect to parallel tracks of a recording medium and more specifically, to such systems utilizing a prerecorded track as a reference for positioning a signal transducer to accurately follow predetermined parallel paths.

In the art of recording information signals on a medium, such as in magnetic or optical recording, there is a trend to increase recording density. This can be accomplished by reducing the recording track width as well as the width of a guard band separating adjacent tracks to minimum. When recording or reproducing such narrow tracks on or from a medium, it is necessary to accurately position the transducer so that it accurately follows a desired path. During recording of information signals on such narrow tracks it is important to provide parallel tracks with each other as accurately as possible in order to utilize the entire surface of the recording medium without overlapping adjacent tracks. During reproduction, it is equally important to precisely position the playback transducer over the recorded tracks and to maintain it in registration with these tracks, otherwise valuable information content may be lost.

Previous developments in the art of reproducing magnetically recorded signals yielded a large variety of track following mechanisms, also referred to as automatic tracking systems. These systems generally utilize a magnetic transducer mounted on a support mechanism whose position may be adjusted with respect to the magnetic medium transport. For example piezoelectric bender or voice-coil actuators have been utilized as transducer positioning means. During playback these tracking systems sense a deviation of the transducing gap from the center of a recorded information signal track. An error signal indicating such deviation is applied to a servo mechanism which, in turn moves the transducer to the desired position. However, these known tracking systems are generally useful only during playback.

As previously indicated it is desirable to record information signals on closely spaced narrow tracks parallel to each-other with a high degree of accuracy and as "straight" as possible, while maintaining a narrow guard band between the tracks. Known prior art longitudinal recording systems utilize the edge of a magnetic medium, for example tape, as a reference for recording parallel longitudinal tracks. In known helical tape recorders, it is also important to accurately guide the tape edge, for example, by known mechanical guiding means, such as band guides or a machined ridge on the drum. Such tape edges are, however, an unreliable reference because they often become damaged, for example, stretched, curled or chopped by improper handling or changed environmental conditions. In addition, magnetic tape edges are often cut in a slightly wavy pattern, generally referred to as having slitting errors caused by the runout of rotating-disc cutters used to cut tape webs to a desired width.

Consequently, in systems where the accuracy of obtaining parallel recorded tracks depends on the mechanical condition of tape edges, gross tracking errors may be introduced when the reference edges are imperfect.

There are also known systems which utilize tracks recorded on the medium as a reference for transducer positioning. In these systems, the position sensing is obtained by transducing channels which are an integral part of the moveable multichannel transducer structure and have to be moved therewith. The position sensing channels contribute to the relatively large size and thus mass of the moveable multichannel transducer. This increases the response time for moving the transducer to a desired position. Another disadvantage is that when it is required of the transducer to follow in sequence a plurality of spaced parallel paths on the medium a plurality of separate reference tracks must be provided, one for each path. These reference tracks significantly reduce the space on the medium which would be otherwise available for recording of useful information signals, thereby reducing the overall obtainable recording density.

SUMMARY OF THE INVENTION

The present invention overcomes the above-indicated disadvantages of known systems as it will follow from the description below.

In accordance with the invention a reference track is prerecorded longitudinally on the recording medium. A transducer for transducing information signals along parallel tracks on the medium is mounted on a positionable member. The member is controlled to move the transducer in a substantially transverse direction relative to the longitudinal direction of the parallel tracks. A reference track sensing head, further referred to as sensor head, which is separate from the information signal transducer, further referred to as data head, is mounted in a fixed relationship to the medium transport. During recording of information signals the sensor head detects a deviation of the reference track and hence the medium in transverse direction from a predetermined position thereof relative to the medium transport. A control signal corresponding to that deviation is applied to control the positionable member which moves the transducer in said transverse direction to follow the deviation.

When the system of the present invention is used to record information signals on parallel tracks extending longitudinally in parallel with the reference track, such as in longitudinal or longitudinal-rotary tape recording, each of these information signal tracks will be equidistant from the reference track over its entire length. When adjacent parallel information signal tracks are recorded on the medium during subsequent passes of the transducer, the same reference track is used during each pass while the distance from the reference track is adjusted for each pass. Each thusly recorded track will be parallel to the reference track and thus adjacent tracks will be parallel with a high degree of accuracy to each other, allowing the use of minimum width guard bands. The same reference track which has been utilized during recording can also be used during playback to follow the thusly recorded parallel tracks in a similar manner.

The foregoing advantages also apply when the system of the invention is used to record and play back information with respect to helical parallel tracks extending at an acute angle with respect to a recording tape length. In this case the helical tracks will be recorded parallel with each other to a high degree of accuracy while maintaining an accurate geometric relationship, that is a predetermined helix angle with respect to the reference track over its entire length.

It is a further important advantage that only a single reference track is required for multiple positions of the information signal transducer across the medium.

It is a further important advantage of the invention that the sensor head is provided separate from the data head and does not have to be moved therewith. The mass of the moveable transducer is thus substantially reduced, thereby reducing the response time required for positioning.

When utilizing the system of our invention, the recorded tracks are parallel, independent of the condition of the edge of the recording medium. At the same time there are no tight constraints imposed on tape slitting and guiding accuracy.

In accordance with a preferred embodiment, the invention is utilized in a magnetic tape recording/reproducing system of the longitudinal- rotary scan type. One or more multichannel information signal transducers are mounted each on a positionable support mechanism or member attached to a rotating scanner drum around the periphery thereof while the tape is being transported in parallel direction with the plane of scanner rotation. A separate reference track sensor head is rigidly mounted on the rotating drum preferably in axial alignment with each positionable multichannel head. A reference track is prerecorded along one edge of the magnetic tape, prior to recording any information signals on the tape by the multichannel heads. Each sensor head detects the magnitude and sense of deviation of the prerecorded reference track from its nominal position in axial direction of the rotating scanner drum that is, in a direction substantially transverse to the length of the reference track. The detected deviation is applied to a servo system which moves the record or playback data head in the same sense and by a corresponding distance to follow the deviation.

In an alternative embodiment of the invention one or more data transducers scan a tape wound in a helical path around a rotating scanner drum. These data transducers scan the tape along parallel helical paths or tracks which extend at an acute "helix" angle with respect to the tape length, that is in parallel with the plane of rotation of the drum, as it is well known in the art of helical tape recording. A number of reference track sensing heads are rigidly mounted preferably in axial alignment with each moveable data head on the periphery of the rotating scanner drum. A reference track is prerecorded along one edge of the magnetic tape similarly as in the preferred embodiment, before the tape is passed around the scanner. Each occurrence of the short signal is compared in time with an accurate timing signal for example derived from the scanner TACH, indicating a correct time for such occurrence which corresponds to the nominal reference track position. The time difference between the two signals indicates a deviation of the reference track and thus of the tape from its nominal path in axial direction. The detected deviation is applied to a servo system which moves the positionable member axially in a sense and by a calibrated distance to follow that deviation. That calibrated distance may be obtained for example by calibrating against a standard prerecorded tape. The data head is thereby maintained in an accurate geometric relationship with respect to the reference track, thus following the subsequent parallel helical paths with a high degree of accuracy. Because of the slight helix angle at which the tape is wrapped around the rotating drum, which angle is selected generally between 5 and 7 degrees, the axial direction of the drum substantially corresponds to a direction transverse to the tape length and hence to the reference track length.

As a further alternative embodiment the invention may be utilized in a longitudinal tape recording/reproducing system where a magnetic tape having the above-described reference track recorded thereon is transported past one or more non-rotating multichannel transducers which are positionable transversely with respect to the direction of parallel longitudinal data tracks. In this example a separate reference track sensing head is rigidly mounted on the longitudinal tape transport and preferably in alignment with each multichannel data head in a transverse direction with respect to the tape length. The position of the data head is controlled in response to a detected deviation of the reference track in a similar manner as it has been described above with reference to the longitudinal-rotary embodiment.

It will be understood by those skilled in the art that instead of a multichannel data head a single channel head may be used in the above-mentioned embodiments.

BRIEF DESCRIPTION OF THE DRAWINGS

FIG. 5 is an elevation view of a rotating scanner portion of a magnetic tape recorder adapted for recording and/or reproducing information signals in accordance with an alternative embodiment of the invention.

FIG. 6, consisting of a-f, shows various waveforms occurring in the block diagram of FIG. 3 when utilized in the alternative embodiment.

FIG. 7 is a block diagram of the alternative embodiment of the invention including a servo system for positioning the data transducer.

FIG. 8 is a timing diagram depicting operation of a portion of the circuit of FIG. 7.

DETAILED DESCRIPTION

Figure 1:
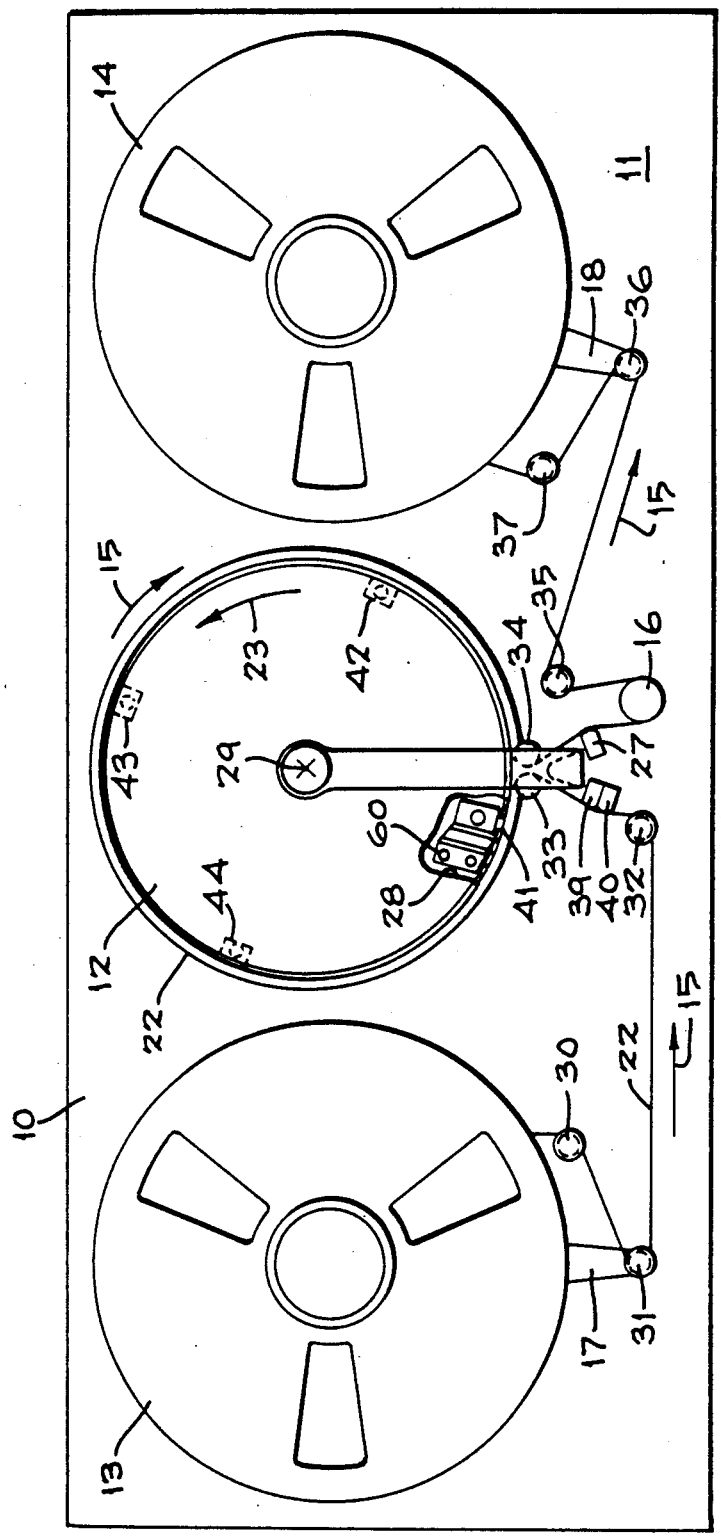
FIG. 1 is a plan view of a longitudinal-rotary scan magnetic tape recorder adapted for recording and/or reproducing information signals in accordance with a preferred embodiment of the invention.

To facilitate comparison between the various drawing figures similar elements will be designated by like reference numerals in all drawing figures.

Referring now to FIG. 1 of the attached drawings, there is shown schematically a magnetic tape recording-/reproducing apparatus 10 of the longitudinal-rotary scan type. The apparatus 10 has a stabilizing base plate 11 on which there are mounted a tape scanning drum 12, a supply reel 13, a take up reel 14, capstan 16, tension arms 17 and 18, tape guides 30 to 37 and fixed heads 39, 40 and 27. The reels 13, 14 and the drum 12 are driven by respective motors (not shown) to obtain a controlled tape tension, in a manner well known in the art. The capstan 16 is driven by a capstan motor (not shown) and it serves to obtain a carefully controlled speed of the magnetic tape 22 in the direction 15 corresponding to the longitudinal direction of tape movement in a well known manner. The tension arms 17, 18 are utilized to precisely control tape tension as well known. The tape guides 30 to 37 guide the magnetic tape 22 in a desired path as follows.

The tape 22 is wound on the supply reel 13, from there it passes over the guide 30 to guide 31 which is mounted on the end of tension arm 17, to guide 32, over two stationery reference track recording heads 39 and 40 to entrance guide 33, around the scanning drum 12 in a path parallel with the plane of rotation of drum 12, around exit guide 34, a stationery control track head 27, around the capstan 16, guide 35, thence to a guide 36 at the end of arm 18, and guide 37 to the take up reel 14. In the context of this description the scanning drum 12 will be considered as part of the tape transport. The principle of longitudinal-rotary scan recorders/reproducers is known in the art and is described in detail for example in U.S. Pat. No. 3,294,902 assigned to the assignor of this application.

Figure 2:
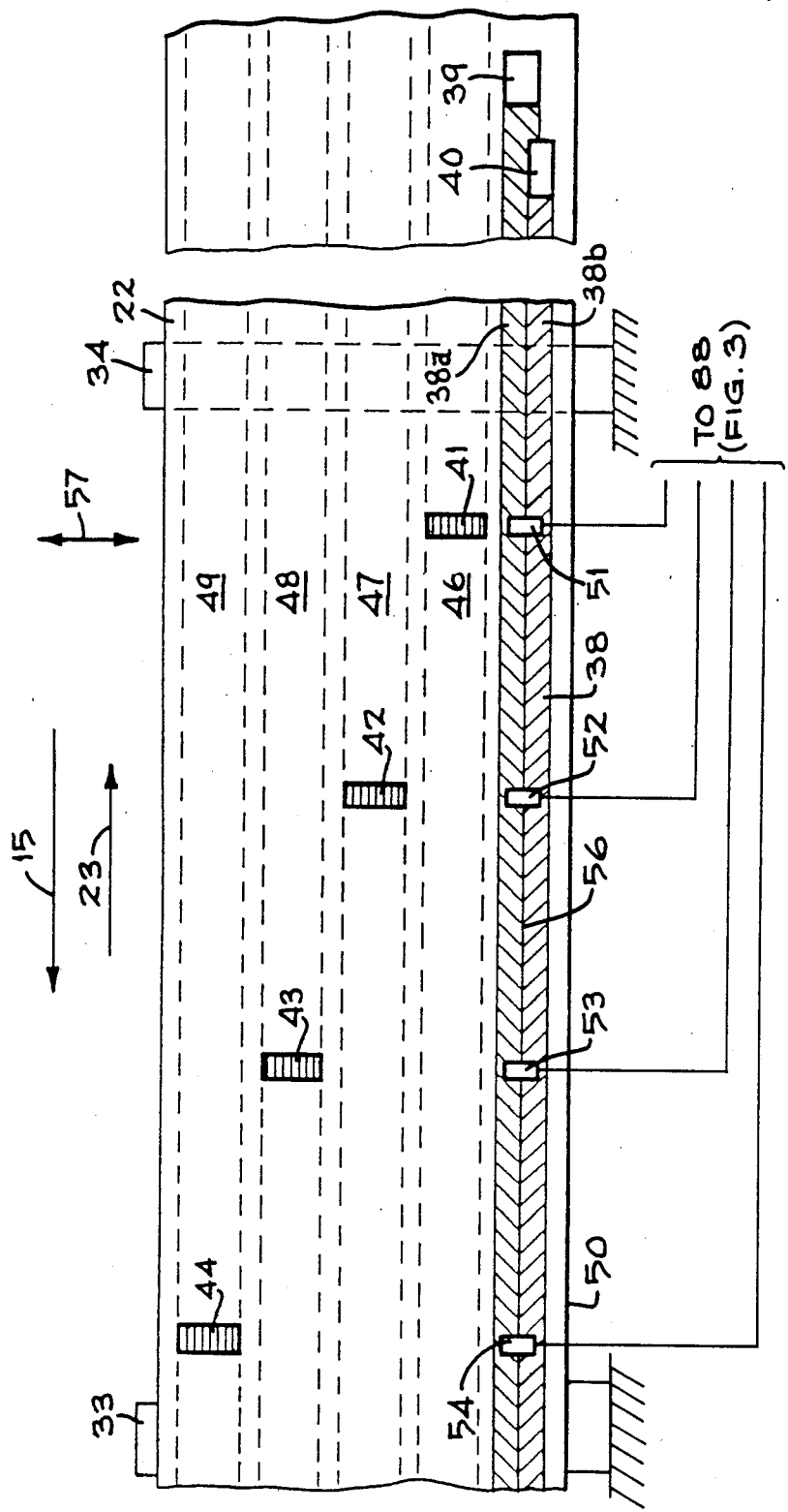
FIG. 2 is a fragmentary elevation view of a stretched out portion of tape shown in FIG. 1, illustrating the respective positions of data heads and sensor heads in relation to the tape in accordance with the invention.

In the preferred embodiment there are four multichannel data heads 41 to 44 positionably mounted around the periphery of the rotating drum 12. These heads are preferably evenly spaced around the drum periphery and they are displaced in the axial direction of the drum so as to sweep four different parallel lanes 46 to 49 on the tape 22, as it is shown in FIG. 2 and will be described in detail. Each multichannel data head 41 to 44 records information signals in one of the lanes 46 to 49 on tape 22, respectively or plays back therefrom information signals which have been recorded in accordance with the invention. A portion of the surface of drum 12 is broken away to show one data head as 41 and positioning mechanism 60 while the other data heads 42 to 44 are shown in phantom.

Each data head is mounted on a positionable support mechanism or arm which allows moving of the head axially, that is in parallel with the axis 29 of the rotating drum 12 and thus in a transverse direction with respect to the length of the magnetic tape 22, as it will follow from further description.

With particular reference to FIG. 2 there is shown a portion of the magnetic tape 22 which is wound around the rotating drum 12 and extends between the entrance guide 33 and exit guide 34, which tape portion has been straightened out for better representation. The four multichannel data heads 41 to 44 are shown as being evenly spaced in the direction of the tape length, that is in the direction of tape motion 15. These data heads are also displaced across the tape width, that is in axial direction 57 of the drum, to enable recording or playback of information signals on a plurality of longitudinal parallel tracks as shown by the parallel lanes 46 to 49, each lane pertaining to one multichannel head.

The reference track 38 extends in longitudinal direction substantially in parallel with one edge 50 of the tape 22. In the preferred embodiment of the invention a reference track 38 is recorded by two longitudinal recording heads 39, 40 which are rigidly mounted on the base plate 11 along the longitudinal tape path upstream of the rotating scanner 12, as it is shown in FIG. 1. Both heads record respective sinewave signals of different frequencies, to obtain a two-tone reference track. As an example, a first reference signal recorded by head 39 on track portion 38a is a lower frequency signal while the head 40 records a higher frequency reference signal on track portion 38b. Heads 39 and 40 are located such that the respective tracks recorded by each head extend side-by-side and define therebetween a border line 56 extending preferably along the center of the thusly recorded two-tone track 38. The record currents are adjusted to obtain equal amplitudes at playback when the sensor head is precisely over the border line 56. It is noted that alternatively another type of reference track may be utilized, for example having two reference signals recorded which have a predetermined phase shift therebetween, as it is known in the art of signal tracking. Still alternatively, a single frequency reference signal may be recorded which is played back by two sensor heads separated from each other in a direction transverse to the reference track length.

In accordance with the preferred embodiment and as it is further shown in FIG. 2, there are four reference track sensing heads 51 to 54 rigidly mounted on the rotating scanner 12, each preferably in axial alignment with one multichannel moveable head 41 to 44. The sensor heads 51 to 54 are located such that when the tape is guided around the drum without any deviation in axial direction from its nominal path, each sensor head is aligned over the border line 56 of the two-tone track 38. In this case each head detects equal magnitudes of both the low and high frequency reference signal indicating zero deviation of the reference track from its nominal position.

Figure 3:
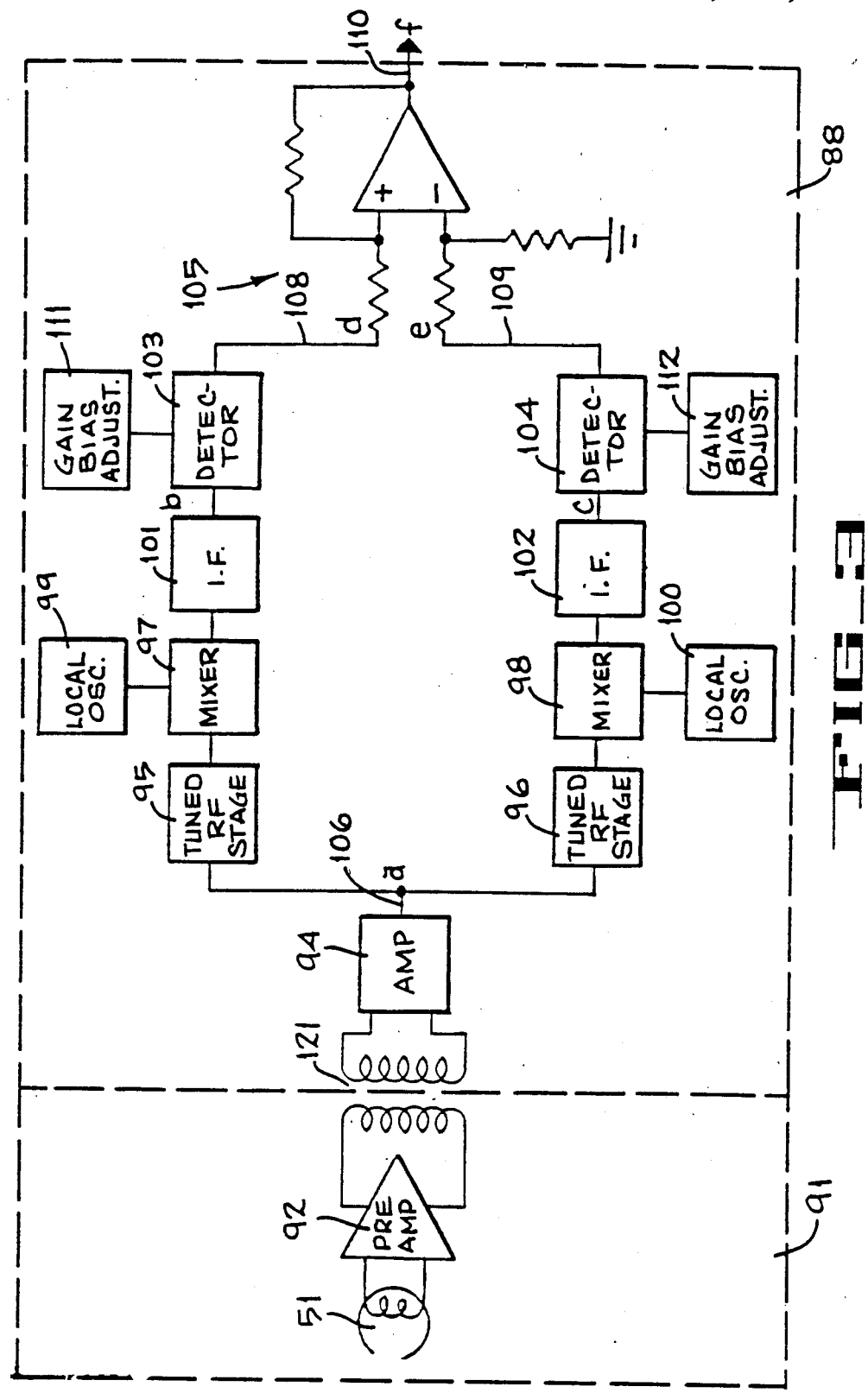
FIG. 3 is a block diagram of a reference track position detecting circuit of a preferred embodiment.
Figure 4:
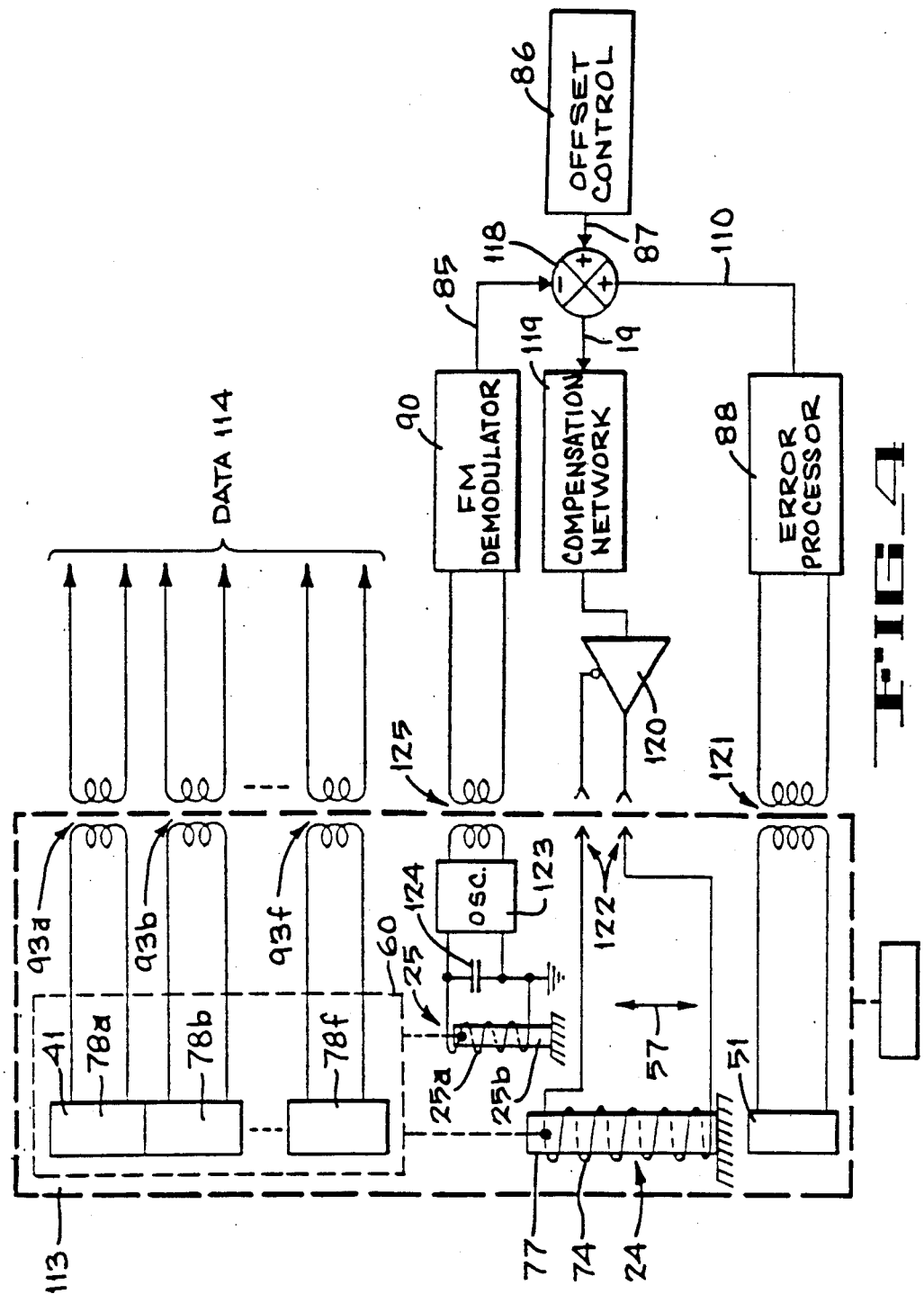
FIG. 4 is a block diagram of the preferred embodiment of the invention including a servo system for positioning the data transducer.

However, when there is a displacement of the tape 22 from its nominal path in axial direction as shown by arrow 57, such deviation is detected by the sensor heads 51 to 54 as an imbalance of the low and high frequency reference signals. The magnitude and sense of that deviation is determined by a tracking error processor circuit shown by the way of example in FIG. 3. An output signal from the circuit of FIG. 3 is applied to a data head positioning servo circuit an example of which is shown in FIG. 4. The servo circuit in turn applies a control signal to a positioning mechanism of a particular data head aligned with that sensor head. The mechanism moves the data head in the axial direction 57 by the same distance and in the same sense corresponding to the detected deviation. The multichannel data head thus equidistantly follows the reference track 38 during recording or reproduction. Consequently in the record mode, all the recorded tracks are parallel with a high degree of accuracy to the reference track. When the apparatus is in playback mode, the multichannel data head follows the parallel tracks which have been recorded in accordance with the invention. To provide a more complete disclosure of the preferred embodiment, the tracking error processor circuit and data transducer positioning servo circuit will be described later in more detail with reference to FIGS. 3 and 4.

In some applications where axial alignment of the data head and sensor head cannot be obtained for example for lack of space on the drum, these heads may be maintained in a predetermined axial relationship with each other.

As an example of a data transducer positioning assembly, a known voice coil motor operated positioning mechanism is preferably utilized such as described in the commonly assigned U.S. Pat. Nos. 4,212,043 and 4,485,414. Both patents are herein incorporated by reference.

Turning now to FIG. 3 there is shown a block diagram of a preferred embodiment of a tracking error processor circuit 88 utilized for sensing the position of the two-tone reference track 38 with respect to a sensor head 51 to 54 mounted on the rotating drum 12. One separate circuit such as shown in FIG. 3 is utilized for each reference track sensor head 51 to 54. To avoid repetition, only one of these heads 51 and corresponding circuit 88 is shown in FIG. 3. A portion 91 of the circuit includes the sensor head 51 and a playback preamplifier 92, both rigidly attached to the rotating drum 12 and rotating therewith. A rotary transformer 121 has a rotating primary winding coupled to an output from the playback preamplifier 92 and a stationary secondary winding coupled to a playback amplifier 94. The playback signal from amplifier 94 is applied via line 106 to two parallel tuned radio frequency (RF) stages 95, 96, respectively. Each RF stage comprises a filter and amplifier. The filter in each stage is tuned to a different frequency, corresponding to one of the playback signal frequencies played back from reference tracks 38a or 38b, by the reference head 51. In the preferred embodiment stage 95 is tuned to 9 MHz played back from track 38a and stage 96 is tuned to 11 MHz played back from track 38b. The thusly filtered and amplified signal in each parallel circuit branch is mixed with a signal from a local oscillator 99, 100 in a mixer 97, 98, respectively to obtain a lower frequency signal as it is well known. The thusly obtained signals from each mixer are filtered and amplified in intermediate frequency stages 101, 102, respectively, as it is well known from conventional superheterodyne radio frequency receivers. The signal from each intermediate stage 101, 102, is applied to a detector 103, 104 which detects changes in the amplitude of the thusly filtered playback signal. Respective gain and bias adjustment circuits 111, 112 are coupled in each of the parallel branches of the circuit of FIG. 3, for example coupled to the detectors 103, 104, respectively. The output signal from each detector 103, 104 is applied via lines 108, 109 to respective inputs of a subtraction circuit 105 which in the preferred embodiment comprises a differential amplifier. The resulting difference signal on line 110 is applied to a servo circuit to control the position of the data head positioning mechanism 60, as it will be described in detail with reference to FIG. 4.

The respective circuit elements in the block diagram of FIG. 3 are preferably of conventional design. In operation, when the reference playback head 51 is centered over the boundary 56 between the respective reference tracks 38a and 38b, the respective amplitudes of both the higher and lower frequency signals reproduced by the head 51 are equal. Consequently both signals on lines 108, 109 at the input of the subtraction circuit are of equal amplitude resulting in a zero output signal on line 110. In this case the multichannel transducer 41 will not be moved to a new position. However when the relative position of the boundary line 56 deviates with respect to the reference head 51 in either one of opposite axial directions 57, the amplitude of one of the higher or lower frequency signal portion of the two-tone playback signal from the head 51 will be greater while the amplitude of the other signal portion will be smaller. Thus, the output signal on line 110 will have a positive or negative value, depending on the sense of the detected deviation and a magnitude corresponding to the magnitude of the detected deviation.

The two-tone tracking error processor is adjusted by the gain and bias adjustment circuits 111, 112 in such a way that when the reference track 38 is sensed as being in its nominal position, the output signal on line 110 is zero. In addition in the preferred embodiment the circuits 111, 112 are adjusted to obtain for every 0.001 inch deviation of the reference track from its nominal position in the transverse direction 57, an output signal on line 110 which effects repositioning of the data head 41 by 0.001 inch in the same direction, as it will also follow from further description with reference to FIG. 4.

Now a preferred embodiment of a servo circuit for positioning a data head in accordance with the present invention will be described with reference to the block diagram of FIG. 4. The rotating portion 113 of the circuitry illustrated in FIG. 4 is shown within a dashed line. Included within this rotating portion is a conventional voice coil motor 24, a data head position sensor 25, a magnetic multichannel data head assembly 41, including channels 78a to 78f, and a reference track sensing head 51. Rotating transformers having respective windings 93a to 93f, 121 and 125 are used for coupling signals between the rotating and the stationary circuitry. Input signals to be recorded by the data channels 78a to 78f are coupled thereto from conventional recording circuits (not shown) via data lines 114 by the means of the rotating transformer windings 93a to 93f, respectively. Alternatively, during signal reproduction the output signals form playback data channels 78a to 78f are coupled by means of the rotating transformer windings 93a to 93f via the data lines 114 to conventional playback circuits (not shown).

The operations of the voice coil motor operated data head positioning member 60 and of the of the data head position sensor 25 of FIG. 4 are similar to those described in the above-referenced U.S. Pat. No. 4,485,414.

The coil 74 of the voice coil motor 24 is shown as being mechanically coupled to the multichannel data head assembly 41. The voice coil 74 receives currents of varying magnitudes and sense causing the coil 74 to act as the moveable element of a linear motor for producing a positioning motion of the head assembly 41 in the axial direction as shown by arrow 57, while movement in other directions is restricted. The stator 77 of the linear motor is shown in FIG. 4 as an inner pole piece that is circumvallated by the coil 74. The stator 77 is rigidly attached to the rotating drum 12.

The data head position sensing transducer or shortly position sensor 25 typically comprises a coil 25a mechanically coupled to the head assembly 41, which coil is wound around a core 25b. The core 25b is rigidly attached to the rotating drum 12. The coil 25a is coupled to a sensing circuit so as to provide electrical signals indicative of the position of the data head 41 as follows. The coil is electrically coupled to input terminals of an oscillator circuit 123, and a capacitor 124 is coupled across these input terminals. One terminal of the capacitor 124 is coupled to ground potential. The output terminals of the oscillator 123 are coupled to one side of the rotating transformer 125. The stationary windings of the transformer 125 are coupled to input terminals of a conventional FM demodulator 90. The output of the demodulator 90 is a calibrated voltage which corresponds to an actual position of the data transducer 41 in axial direction 57, as measured by the head position sensor 25. The output of the FM demodulator 90 is coupled via line 85 to a negative input terminal of a summing junction 118. The position sensor 25, oscillator 123, and FM demodulator 90 form a feedback within the servo circuit of FIG. 4. This feedback ensures a precise relationship between the voltages at the positive inputs to the summing junction 118 and the actual position of the data head 41.

In operation, the oscillator 123 causes the tank circuit formed from the coil 25a and the capacitor 124 to oscillate at a frequency determined by the position of the core 25b within the coil 25a. When the coil 25a is moved to different positions along the core 25b, the frequency of oscillation is changed, which change in frequency is coupled to the FM demodulator circuit 90 across the transformer 125. Accordingly, such changes in the frequency of oscillation cause the FM demodulator 90 to provide a voltage indicative of the measured or actual position of the head assembly 41, which is a function of the frequency of oscillation of the tank circuit.

As it has been described previously with reference to FIG. 2, prior to recording data on tape 22 by the data head 41, the reference track 38 is recorded longitudinally by stationary reference track recording heads 39 and 40. The respective reference track sensing heads 51 to 54 which are rigidly mounted to the scanner 12, sense the position of the prerecorded reference track 38 in axial direction 57. The signal from each sensor head 51 to 54 is applied to a tracking error processor circuit 88 via a rotary transformer, as shown at 121 for head 51. A detected deviation by head 51 in either sense is applied to the previously described error processor circuit 88 of FIG. 3. The previously described output signal on line 110 from circuit 88 is applied to a positive input of the summing junction 118.

Another positive input of the summing junction 118 receives a signal via line 87 from a data head offset control circuit 86. The circuit 86 may be implemented by a variable DC voltage source and it provides a DC voltage offset corresponding to a nominal position or distance of the data head 41 with respect to the reference track 38 in the transverse direction 57, corresponding to a desired track or set of tracks to be recorded or played back.

At the summing junction 118 the previously described output signal from the FM demodulator 90 is subtracted from the sum of signals on lines 87 and 110. The signal from the summing junction 118 is coupled via line 19 to a servo phase compensation network 119 which may be implemented in a well known manner. The output of the phase compensation network 119 is coupled to an input of a motor drive amplifier (MDA) 120, and the output of the MDA is coupled by means of slip rings 122 to an input of the voice coil motor 24. The MDA 120 responsively applies a corresponding current to the windings 74 of the voice coil motor 24 to thereby effect the force necessary to move the multichannel data transducer in a sense and by a distance as determined by the voltage on line 19.

It follows from the foregoing description that the sum of the data head offset voltage on line 87 and the voltage on line 110 from the error processor 88, is modified by the feedback voltage on line 85 from the head position sensor 25. The resulting modified output voltage from the summing junction 118 forces the head positioning mechanism 60 into a new position, thereby following the detected deviation of the reference track 38 from its nominal position. It follows from the foregoing description that during both recording and playback operation the data head of the preferred embodiment is accurately maintained at a desired constant distance from the prerecorded reference track on tape by the above-described circuit of FIG. 4.

Now an alternative embodiment of the present invention will be described with reference to FIGS. 5 to 8, as being utilized in a helical scan magnetic tape recording-/reproducing device. FIG. 5 schematically shows an elevation view of a rotating helical scan drum assembly 140, comprising a rotating upper scanner drum 141 in coaxial arrangement with a stationary lower drum 142. The upper drum 141 is driven by a motor (not shown) in a conventional manner. The rotating drum 141 has one or more data recording or playback transducers positionably mounted around its periphery, one such data transducer 143 being shown. As an example, a conventional two-channel video type transducer 143 is utilized, each channel having a transducing gap 144, 145. The data transducer 143 is mounted on a positionable support mechanism 60, in a manner similar to that described in the preferred embodiment. The mechanism 60 allows moving the data head axially with respect to the rotating drum 141 in the direction of arrow 57, as it has been described with reference to FIGS. 1 to 4.

In accordance with the embodiment shown in FIG. 5, a plurality of sensor heads for example four heads 51a to 51d are rigidly mounted to the rotating drum 141 preferably in axial alignment with the data head 143. A portion of magnetic tape 146 which is transported around the surface of the rotating scanner 141 is shown schematically as being stretched out for better representation. A reference track 38 is recorded longitudinally along one edge 50 of the tape 146 prior to recording data by the head 143. For example, a two-tone reference track 38 is recorded on the tape prior to its entering the scanner 141, in a similar manner as it has been described previously with reference to FIG. 2. Preferably the sensor heads 51a to 51d are equidistantly spaced from each-other in the axial direction 57 so that when these heads pass over the tape 146 at a constant speed their respective transducing gaps 147a to 147d will cross the reference track 38 at predetermined constant intervals, provided there is no displacement of the tape in axial direction 57 from its nominal path. The data head 143 and sensor heads 51a to 51d are arranged such that as the tape 146 moves in the lengthwise direction 148 past the drum 141 rotating in the direction 149, the sensor head 51d which is most distant from the data head 143 crosses the reference track 38 first, followed by sensor heads 51c to 51a. As it will be described later in more detail, each sensor head plays back a signal of short duration of the two-tone signal recorded on the reference track 38. Each such obtained signal is compared in time with a clock pulse occurring at predetermined intervals. Preferably, the clock pulses are derived from the tachometer of the rotating scanner 141.

When the tape 146 precisely follows its nominal helical path while passing over the data head 143, the reference signal pulses obtained by each sensor head precisely coincide with each clock pulse derived from the scanner rotation. However, when the tape position deviates from its nominal path in axial direction 57, some of the sensor heads will pass over the boundary 56 of the reference track 38 earlier or later than the occurrence of a corresponding clock pulse. The previously described tracking error processor 88 of FIG. 3 determines the magnitude and sense of that time difference and applies a corresponding position output signal on line 110. The signal on line 110 is utilized by a data head positioning servo circuit, such as shown in FIG. 7, which is similar to the previously described circuit of FIG. 4. As it will be described in more detail, the servo circuit of FIG. 7 applies a control signal to move the data head 143 positioning mechanism 60 every time when a deviation of the reference track 38 is detected. The mechanism 60 moves the head 143 in the axial direction 57 a calibrated distance in a similar manner as previously described with reference to FIG. 4. The calibration is preferably provided by the error processor circuit 88.

In FIG. 5 there is shown a plurality of parallel helical information or data tracks 150 which have been recorded by the one or more data heads, of which the two-track head 143 is shown. The tracks 150 extend at a predetermined angular orientation α relative to the length of tape 146, that is to the direction 148. Conventionally α is selected between 5 and 7 degrees. For better clarity of representation that angle α is greatly exaggerated in FIG. 5. Thus when a deviation of the boundary line 56 of the reference track 38 from the nominal predetermined tape path is detected by any of the sensor heads 51a to 51d, the data head 143 will be repositioned accordingly in the direction 57 which is parallel with the axis of the scanning drum rotation. Because of the relatively small angle α between the direction of tape length 148 and the length of the helical tracks, also referred to as "helix angle", the data head 143 movement in the direction 57 may be considered as being substantially transverse with respect to the length of both the helical data tracks 150 and the longitudinal reference track 38. By repositioning the data transducer 143 in the direction 57 in response to a detected deviation by any of the sensor heads, a constant geometric relationship is maintained between the prerecorded longitudinal reference track and the data head position, resulting in precisely following parallel helical paths 150 by the head 143 both during recording and reproduction.

More than one longitudinal reference track, spaced preferably at equal distances from each other across the tape width, may be recorded in parallel with each other and sensed by sensor heads, depending on a particular application and a necessary number of tape position measurements required to compensate for tape guiding inaccuracies and related tape position errors. In case one or more reference tracks are required for recording while only one or no reference track is needed for playback, those reference tracks which are not required for playback may be recorded over by the helical data tracks to increase recording area on the medium provided the direction of movement 148 is reversed. A particular location on the reference track could then be sensed by all sensor heads before the over-recording operation by a data head takes place.

Because of the similarities between the alternative embodiment of FIGS. 5 to 8 and the previously described preferred embodiment of FIGS. 1 to 4, only those portions and features of the alternative embodiment will be described in the following detailed description which differ from the preferred embodiment.

With reference now to FIG. 7 there are shown schematically four sensor heads 51a to 51d as being rigidly mounted on the rotating drum 141 in axial alignment with the data head 143. Each channel 157, 158 of the two track head records data along helical tracks 150 shown in FIG. 5, which data are applied thereto from conventional record electronics (not shown) via data lines 161 and rotary transformer windings 93a, 93b, respectively. Alternatively, each data head channel 157, 158 plays back data recorded on helical tracks 150 of FIG. 5 via the rotary transformer windings 93a, 93b, and lines 161 to respective conventional playback electronics (not shown).

As it is further shown in FIG. 7 the output signal from each sensor head 51a to 51d is applied via respective rotary transformer windings 121a to 121d to respective playback amplifiers 161a to 161d. The signal from each amplifier is coupled to stationary contacts of a rotating switch 162. The switch 162 has a moveable contact 167 coupled to an error processor circuit 88 which preferably corresponds to that previously described with reference to FIG. 3. The rotation of the moveable contact 167 of switch 162 is controlled by a control signal on line 163. While in FIG. 7 the switch 162 is described for simplicity as a mechanically rotating switch, it is implemented preferably by an electronic switch. In the presently described embodiment the control signal on line 163 is a clock signal derived from the rotation of the scanning drum 141 and is synchronous therewith. More specifically, the clock signal on line 163 is derived from a conventional tachometer 164 and tach processor circuit 165 utilized with the rotating scanner 141. A timing diagram showing the clock signal on line 163 and related signals is shown in FIG. 8 and will be described later. The signal from switch 162 is applied to the previously described error processor circuit 88.

FIG. 6 shows signal waveforms "a" to "f" as being obtained by each sensor head 51a to 51d and processed in turn by the error processor circuit 88 of FIG. 3. As each sensor head crosses over the two-tone reference track during the tape scanning operation, it plays back a signal envelope as shown at "a" in FIG. 6, corresponding to the signal waveform on output line 106 from the amplifier 94 of FIG. 4. Both the higher and lower frequency signals played back from portions 38a and 38b of the reference track 38 are mixed within that signal envelope. The respective signals at the output from each intermediate stage 101, 102 of FIG. 3 are shown at "b" and "c" in FIG. 6. The signal "b" represents for example the lower frequency signal of the two-tone track 38 and signal "c" the higher frequency signal. The magnitudes of both signal envelopes b and c are equal, as it is shown in FIG. 6. The respective output signals on lines 108, 109 from the detectors 103, 104 of FIG. 3 are shown at "d" and "e" and the output signal on line 110 from the subtraction circuit 103 of FIG. 3 is shown at "f" in FIG. 6. It is seen from FIG. 6 that the maximum amplitude of waveform "a" corresponds to zero axis crossing of waveform "f".

FIG. 8 shows a timing diagram illustrating the operation of a portion of the circuit of FIG. 7 as it will be described below. In FIG. 8 there are shown at "aa" sampling times s1 to s4 occurring at equally spaced timing intervals n corresponding to the switching frequency of the switch 162. Because of switching delays and transients inherent to the switching operation, the clock signal on line 163 is preferably timed between consecutive sampling times, as it is shown at t1 to t4. The foregoing may be obtained by delaying the signal on line 168 in the tach processor 165 with respect to the signal on line 163 by a time equal to n/2. At "bb" there are shown respective waveforms obtained at the output 110 of error processor 88, as previously described and shown at "f" in FIG. 6. Each waveform corresponds to a signal obtained in sequence from respective amplifiers 161a to 161d via the switch 162 and processed by the error processor 88.

With further reference to FIG. 7 the signal on line 110 is applied to a sample and hold circuit 166 which may be of conventional design. Circuit 166 receives via line 168 the previously described clock signal from the tach processor 165 at times s1 to sn and provides sampling signals of short duration as shown at "cc" in FIG. 8. When these sampling signals coincide with the zero axis crossings of waveform "bb" in FIG. 8, as it is shown for example at times s1, s3 and s4, there will be no error signal applied on line 84 at the output of the sample and hold circuit 166. However, when the sample "cc" coincides with a positive or negative portion of the waveform "bb", a positive or negative sample will be provided by the sample and hold circuit 166. As an example, at s2 there is shown a waveform "bb" whose zero axis crossing is offset by an interval m in the negative direction. Consequently, the corresponding sampling signal "cc" coincides with a negative portion of the waveform "bb", thereby providing a negative sample as shown at "dd". That negative sample is held in the sample and hold circuit 166 until the occurrence of the next sample at s3, as it is shown at "ee" in FIG. 8.

The thusly obtained output signal on line 84 from circuit 166 is applied to a positive input of the previously described summing junction 118. The output signal from the previously described FM demodulator 90 is applied via line 85 to a negative input of the summing junction 118. The resulting output signal from the summing junction 118 on line 19 is applied to position the data head 143 in a similar manner as previously described with reference to FIG. 4.

It follows from the foregoing description with reference to FIGS. 5 to 8 that any displacement in time of a zero axis crossing detected by a sensor head and the circuit 88 corresponds to a deviation of the reference track 38 and hence of the tape substantially in transverse direction 57 with respect to the length of the data tracks.

From the foregoing description it will be understood that the number of reference track position samples obtained for positioning each data head is equal to the product of the number of position sensing reference heads associated with that particular data head and the number of reference tracks utilized.

In both the above described preferred and alternative embodiments it may be desirable to provide mechanical adjustment of the rigidly mounted reference track record head in the axial direction of the rotating drum. Such manual or automatic adjustment may be useful for example when a portion of a tape is recorded utilizing a particular recording device, the partially recorded tape is removed from that device and the recording is finished on a different device. Because of the possible differences in mechanical tolerances of the various tape guiding portions as well as in the placement of the reference track recording heads, the respective reference track portions recorded by the different devices may show discontinuity unless these heads are adjusted accordingly.

It is an advantage of the system of the invention that there is no requirement for expensive precise mechanical tolerancing of the location of the data transducer positioning mechanism nor of the reference track position sensing heads within the tape transport structure, provided errors in the placement of these respective elements remain constant for a particular recorder. These errors can be eliminated by calibration for example against a standard recorded tape or by other means.

What is claimed:

1. A recording and/or reproducing system having means for transducing information signals with respect to parallel tracks of a recording medium, comprising:
   a reference signal track recorded in a longitudinal direction on said medium;
   means for transporting said medium past said transducing means;
   means for positionably mounting said transducing means to be moveable in a direction substantially transverse relative to said information signal tracks;
   position sensing means separate from said means for transducing information signals and mounted in a fixed relationship with respect to said transporting means for detecting a deviation of said reference signal track in said substantially transverse direction from a predetermined nominal position thereof with respect to said transporting means;
   means for moving said mounting means in said substantially transverse direction in response to said detected deviation.

2. The system of claim 1 wherein said moving means is coupled to move said positionable mounting means in a sense and by a magnitude substantially equal to a sense and magnitude of said detected deviation.

3. The system of claim 1 wherein said moving means is coupled to move said positionable mounting means to maintain said transducing means at a desired constant distance from said reference track.

4. The system of claim 2 comprising a rotary scan tape recording and/or reproducing system and wherein said transducing means and said sensing means are mounted in a predetermined axial relationship on a periphery of a rotating scanner drum means.

5. The system of claim 4 wherein said transducing means and said sensing means are mounted in axial alignment on the periphery of said rotating scanner drum.

6. The system of claim 1 further comprising stationary transducer means mounted in a fixed relationship to said medium transport for recording said reference signal prior to recording an information signal by said transducing means.

7. The system of claim 6 wherein said reference signal recorded on said reference track is a two-tone signal having a higher frequency and a lower frequency signal, each said signal recorded longitudinally on adjacent reference track portions by respective stationary transducing means.

8. The system of claim 1 further comprising a circuit coupled to receive an output signal from said position sensing means and to provide a signal having a sense and magnitude corresponding to said deviation.

9. The system of claim 1 wherein said recording medium is a magnetic medium and said position sensing means is a magnetic playback transducer.

10. The system of claim 3 wherein said information signal tracks are recorded in parallel with said reference track and said deviation of said reference track is being detected continually.

11. The system of claim 4 comprising a plurality of transducing means positionably mounted along a periphery of said rotating scanner drum, each said transducing means being mounted in a predetermined axial relationship with one said position sensing means.

12. The system of claim 1 wherein said medium transporting means is a longitudinal-rotary type tape transport comprising a rotating scanner drum, wherein said position sensing means is rigidly mounted to said rotating scanner drum and wherein said positioning means is moved in the same sense and by an equal magnitude corresponding to said detected deviation.

13. The system of claim 4 wherein said transporting means is a helical scan tape transport, said parallel tracks are recorded at an acute angle to a plane of rotation of said rotating scanner drum means and wherein said deviation of said reference track is being detected at discrete intervals by said position sensing means.

14. The system of claim 13 wherein more than one position sensing means is mounted to said rotating scanner drum in a predetermined axial relationship with each said transducing means and each said position sensing means detects a sample of said reference signal at a time of crossing said reference track.

15. The system of claim 1 wherein said moving means is coupled to move said positionable mounting means to maintain said transducing means at a desired constant geometric relationship with respect to said reference track.

16. The system of claim 4 wherein said transporting means is a helical tape transport, said parallel tracks are recorded at a selected acute angle with respect to a plane of rotation of said rotating scanner drum means and said deviation of said reference track is detected at a time of crossing said reference track by said position sensing means.

17. The system of claim 16 wherein more than one sensing means is mounted to said rotating drum in a predetermined axial relationship with said transducing means and substantially equidistantly spaced in axial direction of said rotating drum with respect to each-other and wherein said deviation of said reference track is detected at discrete intervals as a difference in time between a time of actual crossing of said reference track by a position sensing means and a time of crossing a reference track which is in nominal position.

18. The system of claim 16 wherein more than one reference track is recorded in parallel and at substantially equal distances from each other.

19. A magnetic tape recording and/or reproducing system having a transducer for transducing information signals with respect to parallel tracks extending in a longitudinal direction corresponding to a length of said tape, comprising:
a reference signal track recorded on said tape in said longitudinal direction;
means for transporting said tape past said information signal transducer;
means for positionably mounting said information signal transducer to be moveable in a substantially transverse direction relative to said information signal tracks;
a reference track position sensing magnetic playback head separate from said information signal transducer and mounted in a fixed relationship with respect to said tape transport means for detecting a deviation of said reference signal track in said substantially transverse direction from a predetermined nominal position thereof with respect to said transporting means; and
means for moving said positionable mounting means in said substantially transverse direction by a magnitude and in a direction corresponding to said detected deviation.

20. A longitudinal-rotary scan magnetic tape recording and/or reproducing system having a rotating scanner drum, comprising:
a transducer for transducing information signals with respect to parallel tracks extending in a longitudinal direction corresponding to a length of said tape;
means for positionably mounting said information signal transducer on a periphery of said rotating scanner drum to be moveable in a substantially transverse direction relative to said parallel tracks;
a reference signal track recorded on said tape in said longitudinal direction prior to being transported around said rotating scanner drum;
a reference track position sensing transducer separate from said information signal transducer and rigidly mounted on said periphery of the rotating scanner drum for detecting a deviation of said reference signal track in said substantially transverse direction from a predetermined nominal position thereof on said drum, said position sensing transducer being associated with said information signal transducer in a predetermined axial relationship; and
means for moving said positionable mounting means in said substantially transverse direction by a magnitude and in a direction corresponding to said detected deviation.

21. A helical scan magnetic tape recording and/or reproducing system having a rotating scanner drum, comprising:
a magnetic transducer for transducing information signals with respect to parallel tracks extending at an acute angle with respect to a plane of rotation of said drum;
means for positionably mounting said information signal transducer on a periphery of said rotating scanner drum to be moveable in a substantially transverse direction relative to said parallel tracks;
a reference signal track recorded on said tape in said longitudinal direction prior to being transported around said rotating scanner drum;
a plurality of reference track position sensing transducers separate from said information signal transducer and rigidly mounted on said periphery of said rotating drum in a predetermined axial relationship with said information signal transducer, said position sensing transducers equidistantly spaced in an axial direction of said drum for crossing said reference track at equal intervals when said reference track is in a predetermined nominal position thereof on said drum;
means for detecting a difference in time of an actual crossing of said reference track by said position sensing means and a time of crossing a reference track which is in nominal position; and
means for moving said positionable means in said axial direction in response to said detected deviation to maintain said information signal transducer in a desired constant geometric relationship with respect to said reference track.

22. A method of transducing information signals with respect to parallel tracks of a recording medium, comprising the steps of:
recording a reference signal on a reference track extending longitudinally on a medium;
transporting said medium having said reference track recorded thereon past a positionable transducer for recording said information signals on said parallel tracks;

detecting a deviation of said reference track from a nominal position thereof with reference to a medium transport means in a direction substantially transverse to a length of said reference track; and positioning said transducer in said substantially transverse direction to said parallel tracks in response to said detected deviation, to maintain a predetermined constant geometric relationship thereof with respect to said reference track.

23. A method of transducing information signals in a longitudinal rotary scan magnetic tape recording and/or reproducing system with respect to parallel tracks of a magnetic tape extending in a longitudinal direction of said tape, said system comprising a rotating drum having an information signal transducer positionably mounted thereon, comprising the steps of:

recording a reference signal on a reference track extending in said longitudinal direction;

transporting said tape having said reference track recorded thereon past said transducer;

detecting a deviation of said reference track in a substantially axial direction of said rotating drum from a nominal position thereof on said drum; and positioning said transducer in said substantially axial direction in response to said detected deviation, to maintain said transducer at a constant distance from said reference track.

24. A method of transducing information signals in a helical scan magnetic tape recording and/or reproducing system with reference to parallel tracks of a magnetic tape extending at an acute angle to a length of said tape, said system comprising a rotating drum having an information signal transducer positionably mounted thereon, comprising the steps of:

recording a reference signal on a reference track extending longitudinally in a direction corresponding to a length of said tape;

transporting said tape having said reference track recorded thereon past said transducer;

detecting a deviation of said reference track in a substantially axial direction of said rotating drum from a nominal position thereof on said drum at predetermined axially displaced locations with respect to said transducer; and positioning said transducer in said axial direction in response to said detected deviation, to maintain a predetermined constant geometric relationship thereof with respect to said reference track.

* * * * *